Dec. 26, 1961
G. H. BOUCHARD ETAL
3,014,813
ELECTROLUMINESCENT LAMP
Original Filed Jan. 17, 1955
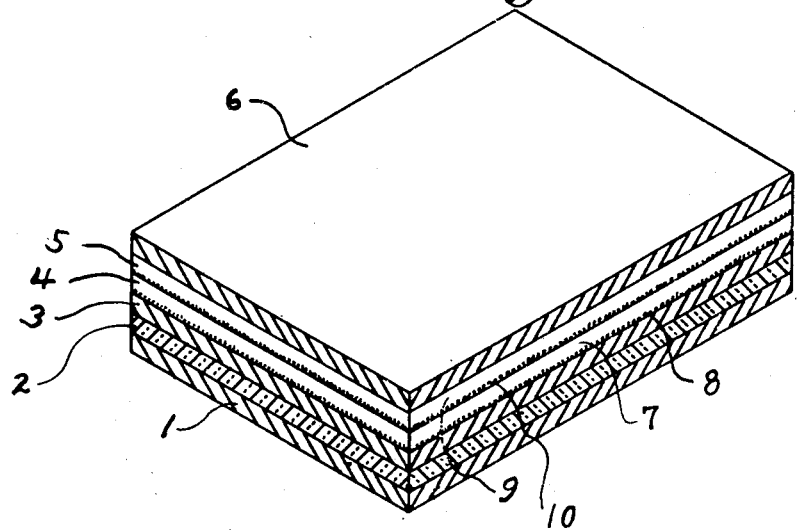
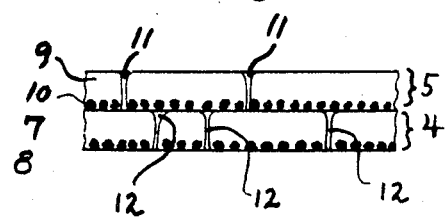
INVENTORS
GEORGE H. BOUCHARD
JOSEPH A. DOMBROWSKI
BY
ATTORNEY

United States Patent Office 3,014,813
Patented Dec. 26, 1961

3,014,813
ELECTROLUMINESCENT LAMP
George H. Bouchard, Ipswich, and Joseph A. Dombrowski, Lynnfield Center, Mass., assignors to Sylvania Electric Products, Inc., Salem, Mass., a corporation of Massachusetts
Original application Jan. 17, 1955, Ser. No. 482,126. Divided and this application June 4, 1957, Ser. No. 663,474
3 Claims. (Cl. 117—33.5)

This invention relates to electroluminescent lamps and to methods of manufacturing them. In particular, it relates to lamps in which the phosphor is embedded in a dielectric material.

Such lamps have previously had a coating of phosphor and dielectric applied by spraying. We find, however, that a more uniform coating of greater brightness and higher dielectric strength can be applied by settling the coating from a temporary suspension of the fine particles of phosphor and dielectric in a liquid medium. The liquid should be one in which the particles will not readily dissolve, that is the phosphor and dielectric particles should not be readily soluble in the liquid used. Powdered ceramic is especially useful as the dielectric material.

An advantage of our invention is that the electroluminescent layer produced is uniform and accordingly free from mottled portions. Dielectric breakdown is often caused by very small pinholes extending through the layer of phosphor and dielectric. We find that such breakdown can be greatly reduced by depositing the phosphor-dielectric coating in at least two layers, one over the other, partly because the probability of any pinholes in one layer lining up with those in the other layer to produce a direct path from one electrode to the other is very small. This is especially true when each layer is deposited under somewhat different conditions.

Lamps can be made with a single phosphor-dielectric coating by using extreme care to keep all materials free from lumps, lint, room-dust, and the like, and by carefully controlling the particle size so that exactly the right proportions of ceramic and phosphor are settled down together. Such extreme care and cleanliness is difficult and expensive to maintain in production.

However, we have found that by settling the material in two coatings or layers, a satisfactory device can be made without the need for such extreme precautions.

For example, we can apply a transparent conductive film to a porcelain enamel surface to act as one electrode, and then apply the first phosphor-dielectric coat over the conductive film and heat it at a low temperature such as 1150° F. to sinter the coating without damaging the film. The comparatively low temperature of the firing reduces any possible damage to the phosphor during the first heating. It burns out any contaminants that may be present, without causing any holes and without disturbing the coating. The second coat is generally applied as soon as the first coat has cooled, but we find that the surface of the latter will not be affected by the small amount of contamination picked up even if the coating is allowed to stand overnight. The second coat is fired at a higher temperature.

In our process, there is a selective settling by particle size, the larger part of the phosphor settling first with the larger ceramic particles. The finer phosphor particles then settle with the medium-sized ceramic particles and finally a layer of very fine glass particles settles, nearly free of phosphor. With two thin coats there is a duplication of these layers, which appears to give a lamp of high dielectric strength for a given weight or thickness of coating.

Other objects, features and advantages of the invention will be apparent from the following description taken in connection with the accompanying drawing, in which:

FIGURE 1 is a schematic view of the lamp; and
FIGURE 2 is a schematic view of the two superposed phosphor-dielectric layers.

In FIGURE 1, the metal backing plate 1 carries a porcelain enamel coating 2 such as is known in the art, the enamel preferably being white, and which can have any convenient thickness, for example 10 mils. A transparent conductive coating 3 of stannous chloride or the like is preferably applied as in the copending application Serial No. 365,617, filed July 2, 1953 by Richard M. Rulon, over the enamel. The first and second coatings 4, 5 of phosphor and ceramic are over the conductive coating 3, and another transparent conductive coating 6, applied as before, over the coating 5. Provision for connections to an electric power line can be made as in said Rulon application.

In FIGURE 2, the phosphor-dielectric layers 4, 5 are shown schematically. The layers 4, 5 contain a ceramic material 7, 9 with the phosphor particles 8, 10 mostly at the bottom of each layer. The figure is schematic, and while most of the phosphor particles are near the bottom of the layer, not all of them are in that position. The holes 11, 11 in the top layer 5 are seen to be out of register with the holes 12, 12, 12 of the bottom layer 4, so that there is no direct breakdown path through both layers 4, 5, in series. Moreover, the portion of nearly clear glass, almost free from phosphor, at the top of each layer, also improves the dielectric strength.

In making a lamp according to one embodiment of the invention, a clear metal tank large enough to hold one or more lamps of the desired size in a horizontal position is vacuum-cleaned and flushed with alcohol. The enamel coating 2 on metal backing plate 1, is brushed with a soft-bristled brush to remove dust and any abrasive material, and placed on a rack at the bottom of the tank, preferably spaced a short distance, for example ¼ inch, above the bottom of the tank.

A suspension of ceramic and phosphor in a suitable liquid is then poured into the tank through a strainer. Unnecessary turbulence and splashing of the material on the coating 2 should be avoided.

A cover is placed on the tank and the phosphor-dielectric material is allowed to settle out for about 15 minutes. The remaining suspension is then drained slowly from the tank and the coating 4 allowed to partially dry while the tank is covered, for example for about five minutes, if in still air at room temperature. Under other conditions, the time may be different, but in any case it should be long enough to dry the coating sufficiently to allow the removal of the piece from the tank without producing flow lines in the coating, due to running of any undried material. If the amount of phosphor and ceramic in the suspension is increased, the time for deposition of a coating can be reduced to 1½ minutes or less. After partial drying, the cover is removed and the coating completely dried.

The coating is then fired in a furnace at about 1150° F. The coated piece is then returned to the tank and the process repeated. The resultant coating should be snowy-white and very smooth and even. The dried piece is then fired at 1250° F.

The coating suspension is made in a 5-quart ball mill with 3000 grams of pebbles. About 2000 grams of ceramic frit are added to the mill and about 1500 cc. of methyl alcohol. The mixture is milled for about 16 hours, after which about 800 grams of phosphor and 500 cc. of methyl alcohol are added. The resultant mixture is then milled for an hour, and poured into a jar through a 200-mesh sieve. The mill is then rinsed with 650 cc.

of methyl alcohol and the rinsings added to the jar through the 200-mesh sieve. The suspension in the jar is then rolled in its jar (which has been sealed) for 20 minutes before being used.

To one part of the above suspension is added a mixture of 210 parts of a 50% methyl and 50% isopropyl alcohol mixture. If a tank with a horizontal cross-section of 26 inches by 26 inches is used, 7500 cc. of methyl alcohol and 7500 cc. of isopropyl alcohol will be used with 70 cc. of the milled suspension. This will fill the tank to about 1¼ inches above piece to be coated, which will be lying horizontally in the tank, about ¼ inch from the bottom.

Although other suspending liquids can be used, the above mixture of methyl and isopropyl alcohols has been found very effective in producing a uniform unmottled coating of high brightness and dielectric strength. The liquid used should preferably have a specific gravity, viscosity and volatility about the same as that of the mixture above. If the specific gravity and viscosity are too low, the particles will settle out too fast, without the selective action which has proven beneficial. On the other hand if the volatility is too great, drying will occur too fast, before the coating has time to smooth out. Isopropyl alcohol alone, or methyl alcohol alone, can be used but is not as satisfactory as the mixture given.

Toluol or water can also be used, but the coating will be less uniform. With water, the drying rate should be increased by forced ventilation to prevent streaks in the coating. Such streaks occur with slow drying.

The phosphor used can be any suitable electroluminescent phosphor, for example the phosphors of copending applications Serial Nos. 230,711 and 230,712, filed on June 8, 1951 respectively, by Keith H. Butler, and by Keith H. Butler and Horace Homer, and now U.S. Patent Nos. 2,772,242 and 2,745,811, respectively.

The ceramic frit used can be of the kind shown in copending application Serial No. 365,617, filed July 2, 1953 by Richard M. Rulon. One such frit can, for example, contain 3.9% CaO, 4.8% BaO, 27.2% ZnO, 21.8% $SiO_2$, 26.8% $B_2O_3$, 8.8% $Na_2O$, 0.7% PbO, 5.8% $R_2O_3$, the percentage being taken by weight. In the last named compound, R has been used as a generic term to include one or more metals whose oxides can exist in the imperial form $R_2O_3$. Lead should not be present in the material in any substantial amount in a form which can react with the phosphor to form a black, light absorbing layer such as lead sulfide.

To protect the device from deterioration in high humidities, a glaze of plain glass frit, without phosphor, is generally placed over the transparent conductive film 6 and around the edges of the device to seal the same. This glaze can be applied in the same manner as the coating containing phosphor, except that the phosphor is omitted. For example, 2000 grams of the glass frit can be added to the ball mill with 1500 cc. of isopropyl alcohol and rolled in the mill for about two hours, after which it is poured off into a jar and about 650 cc. of isopropyl alcohol added to the mill to rinse the latter. The rinsings are added to the suspension in the jar, the latter sealed and then rolled for about fifteen minutes. This suspension can then be applied by settling and fired as with the second phosphor-ceramic coating 5.

For complete humidity protection, a layer of low viscosity resin, for example an alkyd styrene urea copolymer, is deposited over the glaze, having a thickness of about two mils. This will fill any pores in the glaze and complete the humidity seal.

A composite seal of that type is more effective than an all-glass seal or an all-resin seal.

In order for the phosphor particles to settle out first, they should ordinarily have either higher specific gravity or particle size, or both, than the ceramic particles. The copper-activated zinc sulfide phosphor used in the examples herein had a specific gravity of 4.0, and the ceramic particles one of 2.5. The zinc sulfide particles had an average size of 10 to 20 microns, and the ceramic particles an average size from about one-third to about one-tenth as great. The smallest phosphor particles had a size of about 0.5 micron, and the smallest ceramic particles a size of about 0.5 micron.

The ceramic powder has sometimes been referred to as ceramic frit or glass frit in the foregoing description.

This application is a division of our copending United States patent application Serial No. 482,126, filed on January 17, 1955 for an Electroluminescent Lamp, and issued on February 25, 1958 as United States Patent 2,824,992.

What we claim is:

1. The process of coating a base piece with an electroluminescent layer of predetermined thickness, said process comprising: mixing powdered zinc sulfide phosphor particles of from 10 to 20 microns size and powdered ceramic particles of between one-third and one-tenth the size of the phosphor particles with a mixture of methyl and isopropyl alcohol, and immersing the base piece in it for a time sufficient to deposit on it a coating of predetermined thickness.

2. The process of coating a base piece with electroluminescent phosphor, said base plate having a conducting film thereon, said process comprising: settling a coating of phosphor particles and ceramic particles onto said base piece from a temporary suspension in a mixture of methyl and isopropyl alcohols, the phosphor particles being from 10 to 20 microns in size and the ceramic particles being between one-third and one-tenth the size of the phosphor particles, drying said coating to free it from said mixture of methyl and isopropyl alcohols, firing said coating at a temperature of about 1150° F. and high enough to sinter said ceramic without affecting the conducting film, settling another such coating over the first coating, and then firing at a higher temperature of 1250° F.

3. The process of coating a base piece with electroluminescent phosphor, said process comprising: settling a coating of said phosphor particles and ceramic particles onto said base piece from a temporary suspension in a mixture of methyl and isopropyl alcohols, the phosphor particles being from 10 to 20 microns in size and the ceramic particles being between one-third and one-tenth the size of the phosphor particles, drying said coating to free it from said mixture of methyl and isopropyl alcohols, firing said coating at a temperature of about 1150° F. and high enough to sinter said ceramic, settling another such coating over the first coating, and then firing at a higher temperature of 1250° F.

References Cited in the file of this patent

FOREIGN PATENTS

| | | |
|---|---|---|
| 118,070 | Australia | Feb. 10, 1944 |
| 617,099 | Great Britain | Feb. 1, 1949 |
| 721,513 | Great Britain | Jan. 5, 1955 |